United States Patent

[11] 3,566,843

[72] Inventors Robert L. Van Huis;
Dee Dexter Allen, Zeeland, Mich.
[21] Appl. No. 721,720
[22] Filed Apr. 16, 1968
[45] Patented Mar. 2, 1971
[73] Assignee U. S. Industries, Inc.
New York, N.Y.

[54] POULTRY FEEDER PAN FOR AUGER-TYPE FEEDERS
15 Claims, 4 Drawing Figs.

[52] U.S. Cl. .................................................. 119/53
[51] Int. Cl. .................................................. A01k 5/00
[50] Field of Search .................................... 119/52,
51.11, 53, 53.5, 56; 198/213, 64; 222/412, 413

[56] References Cited
UNITED STATES PATENTS

| | | | |
|---|---|---|---|
| 1,906,395 | 5/1933 | Meeks ........................... | 198/213 |
| 2,961,126 | 11/1960 | Craig ............................. | 119/53X |
| 3,211,339 | 10/1965 | Piper et al. .................... | 119/56X |
| 3,230,933 | 1/1966 | Myers et al. ................... | 119/53 |

*Primary Examiner*—Hugh R. Chamblee
*Attorney*—Price, Heneveld, Huizenga and Cooper ABSTRACT: A poultry feeder pan and supply conveyor arrangement, of the type wherein the supply conveyor has an opening in its bottom through which feed is dropped into the feeder pan, wherein the feeder pan includes a baffle plate and a platelike feeler arm spaced from the latter and positioned parallel thereto, to thereby define a channel which confines the feed dropped into the feeder pan for better sensitivity and increased reliability of a switching means controlled by such feeler arm. Where the supply conveyor is an auger operating within a tubular housing, the structure of the invention includes an arbor shaft rotatably mounted within such housing, along the axis of the auger, and having a circular pluglike member mounted on the shaft immediately downstream of the aforementioned feed-drop opening in the tubular auger housing, to which the downstream end of the auger is secured and which provides an anchor therefor. This pluglike member positively impedes the passage of feed along the conveyor tube beyond the opening in the latter through which feed drops into the feeder pan, such that all feed is, in effect, blocked within the auger tube and thrust downward into the feeder pan. Further, a circular disclike bearing is secured to the arbor shaft immediately downstream of the aforementioned pluglike member to support the arbor shaft at such point and, at the same time, to positively block any feed from working its way downstream beyond that point. This bearing rotates upon the arbor shaft and against the inside of the auger housing, and it preferably has an outer or circumferential periphery of lubricous plastic or the like to reduce the frictional contact between it and the auger housing.

PATENTED MAR 2 1971 3,566,843

INVENTORS
ROBERT L. VAN HUIS
DEE DEXTER ALLEN
BY Price, Heneveld
Huizenga & Cooper
ATTORNEYS

INVENTORS
ROBERT L. VAN HUIS
DEE DEXTER ALLEN
BY
ATTORNEYS

POULTRY FEEDER PAN FOR AUGER-TYPE FEEDERS

BACKGROUND

Poultry feeders are now in common usage which utilize an elongated feed conveyor and a plurality of feeder pans disposed beneath the feed conveyor and in flow communication with feed drop openings located in the bottom of the conveyor trough or housing, such that as the conveyor moves feed along its length the feeder pans are gradually filled by the feed dropping downwardly into them. Normally, most of the feed moved along the conveyor falls first into the first feeder pan encountered along the length of the conveyor until such pan is filled, whereupon the next feeder pan in the succession thereof is filled, then the next, etc.

In such a system, the feed conveyor is normally shut off at such time as the last feeder pan in the sequence thereof becomes filled; thus, it is manifestly desirable to incorporate a feed-sensing means in the final such feeder pan, by which the feed conveyor is automatically shut off when this feeder pan is filled. It is, of course, exceedingly important to have a sensitive and reliable feed-sensing means for controlling the feed conveyor, so that the same will not be shut down until the last feeder pan in the succession thereof is actually filled with feed, and also so that the feeder conveyor will absolutely be shut off without fail at the correct time.

Further, when auger-type feed conveyors are used, as is frequently the case, it is very important that the feed carried along the length of the conveyor to the last feeder pan actually drop into such pan and not be carried therebeyond, since an auger-type conveyor always has either a drive motor and gear head assembly or else a bearing assembly at its downstream end and it is of utmost importance that feed moved along the length of the conveyor be prevented from being forced into such bearings and/or gear head by the operation of the auger, inasmuch as this will contaminate and foul the same, with resultant malfunction and breakdown.

Previous feeder systems of this type have been subject to numerous difficulties and chronic problems in the sensitivity and reliability of their automatic conveyor shutoff mechanisms, and they also have been subject to numerous difficulties and instances of bearing failure due to compacted feed either pushed or pulled into the bearings by the operation of the auger.

SUMMARY OF INVENTION

The present invention provides a feeder pan for feeder systems of the aforementioned nature, wherein an improved feed-sensing apparatus is provided to achieve greater control sensitivity and reliability, and wherein feed barrier means are provided within the auger housing for simultaneously preventing feed from moving beyond a desired point while at the same time forcing such feed into the feeder pan which controls the feed conveyor.

Briefly stated, the improved feed-sensor means comprises baffles within the feeder pan which shape the downwardly falling feed into a more-or-less confined stream, and one such baffle is movably mounted to act as a paddle-shaped feed-sensor arm. The barrier means is provided as a part of a bearing assembly for the downstream end of the feed-conveying auger, and includes an arbor rod or shaft journaled in a bearing at the end of the auger housing and having a disclike auger anchor immediately adjacent the feed-drop opening in the bottom of the auger housing.

DRAWINGS

PREFERRED EMBODIMENT

Figure 1:
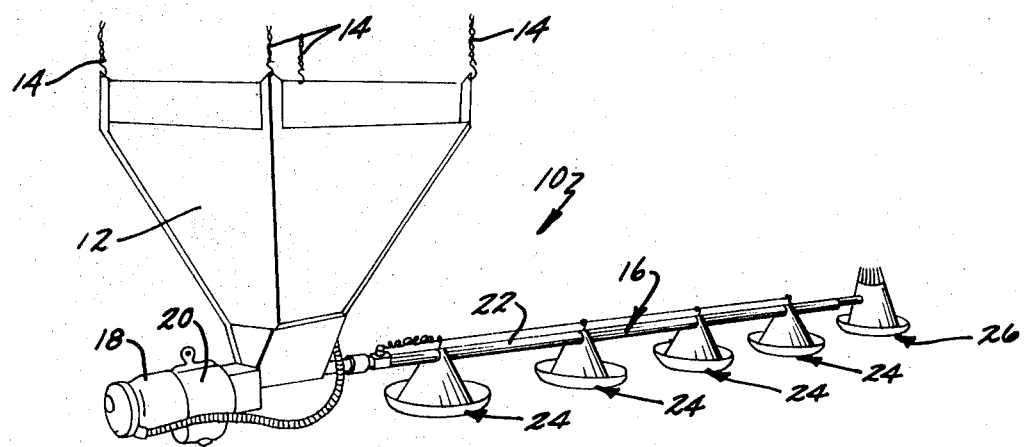
FIG. 1 is a fragmentary perspective view of a feeder system utilizing the feeder pan of the invention.

Referring now in more detail to the drawings, the overall basic nature of a feeder system of the general type with which the feeder pan device of the invention is best suited is illustrated in FIG. 1. This feeder mechanism 10 includes a supply hopper 12 which is preferably suspended from overhead by cables or chains 14, and a feeder conveyor 16 communicating with the bottom extremity of the hopper 12 and extending laterally away from the same. As illustrated, the feeder conveyor 16 is of the auger type which, as will be understood, includes a movable auger (usually an open-centered helical member) enclosed within a relatively closely fitting tubular housing. The auger extends through the bottom of the supply hopper 12 and, in the example illustrated, is driven by an electric motor 18 whose output is coupled to a reduction gear head 20. Driving rotation of the auger member transfers feed from the bottom of the supply hopper 12 along the length of the tubular housing 22 for the auger, through openings in the bottom of which the feed drops downwardly into each of a sequence of identical feeder pans 24 and into a control feeder pan 26 located at the outboard end extremity of the feeder conveyor. The specific nature of the control feeder pan 26, and the concepts underlying the embodiments thereof disclosed herein, comprise the basis of the present invention.

Figure 3:
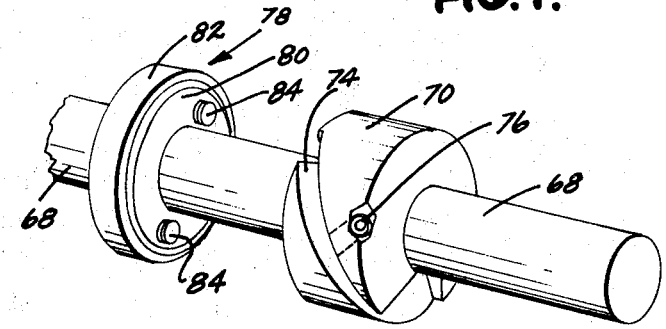
FIG. 3 is an enlarged, fragmentary perspective view of a portion of the improved structure.
Figure 4:
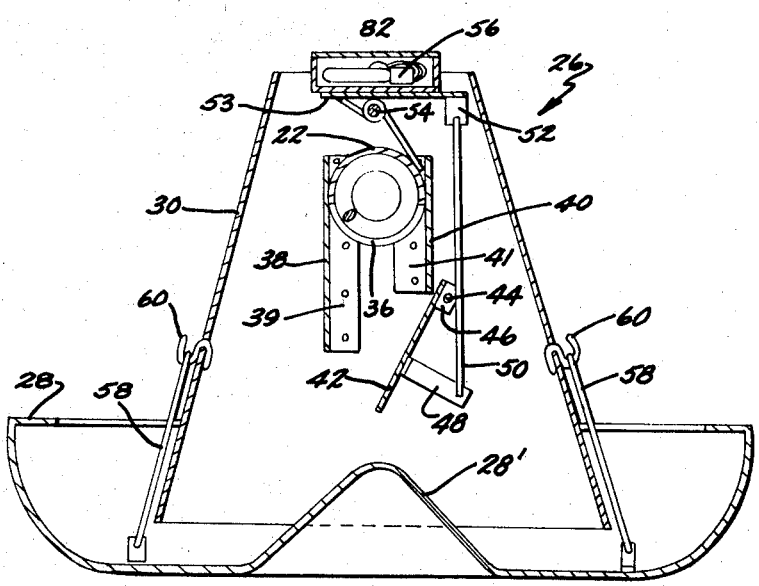
FIG. 4 is a cross-sectional elevation taken through the plane IV—IV of FIG. 2.
Figure 2:
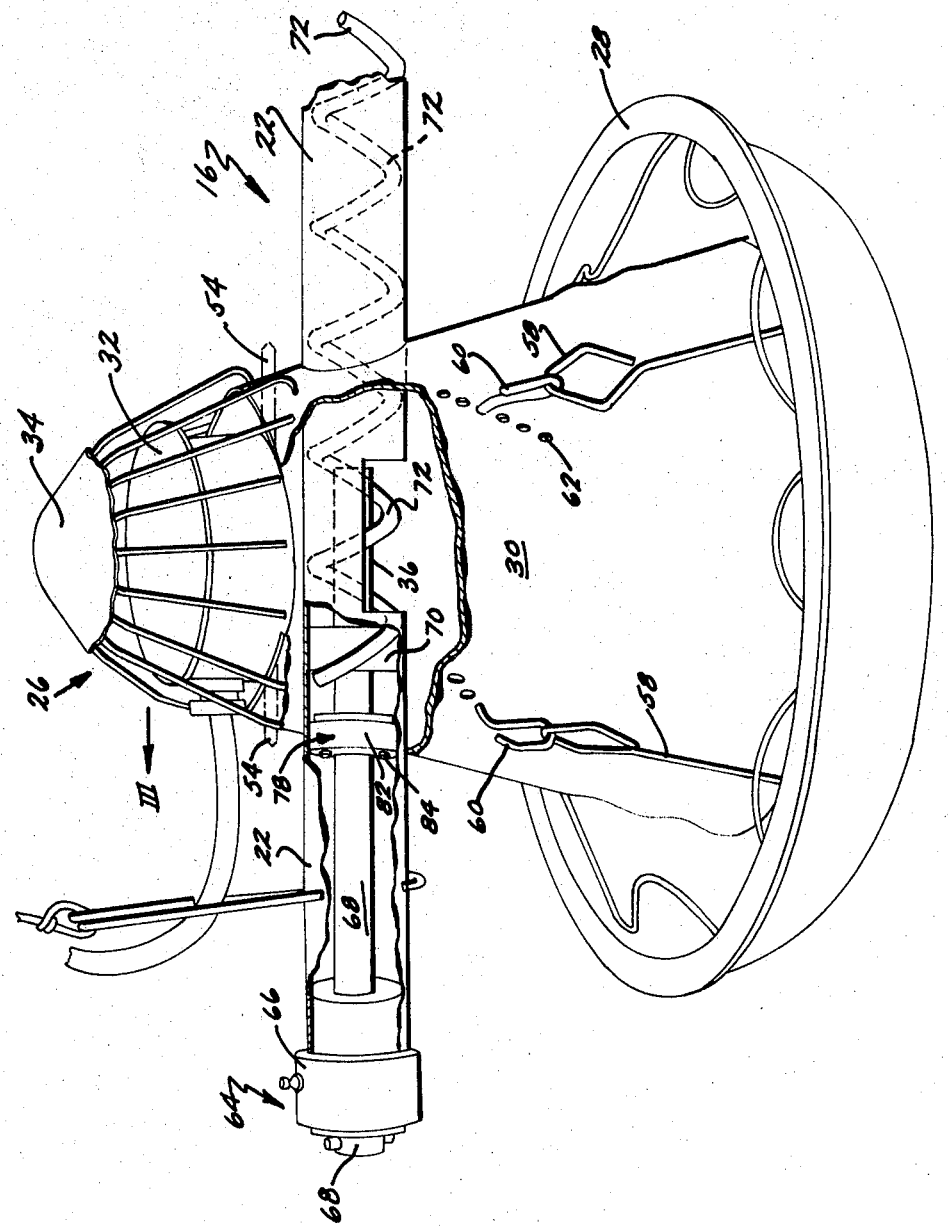
FIG. 2 is an enlarged, fragmentary perspective view of the feeder pan, with certain sections being broken away to show internal details.

The outboard end extremity of the feeder conveyor 16, and the control feeder pan 26, are seen in more detail in FIGS. 2, 3, and 4. Referring first to FIG. 2, it will be observed that feeder pan 26 has at its bottom extremity a basically concave, dishlike feed dispensing pan portion 28, which is suspended from a vertically disposed hollow cone-shaped feed-drop member 30. The latter should be open at the bottom and also is preferably open at the top, at which location a boxlike housing 32 for electrical switching means is mounted, described in more detail hereinafter. As illustrated, a basketlike guard member 34 is preferably fitted over the top of the feed-drop member to protect switch housing 32 and prevent it from being jarred or moved inadvertently.

The tubular housing 22 of the feeder conveyor 16 preferably passes directly through the upper extremities of the conical feed-drop member 30, through an appropriate pair of diametrically opposed apertures formed in the upper walls thereof. Inside the conical walls of the feed-drop member 30, and spaced therebetween, the auger tube 22 has an opening 36 (FIG. 2) formed in its bottom extremity, preferably of an extent amounting to the lower one-half of the tubular housing. It is through opening 36 that feed being moved along the auger tube enters feeder pan 26, i.e., by falling downwardly through the aforesaid opening, into and through the feed-drop member 30, and downwardly onto the feed-dispensing pan 28. As best seen in FIG. 4, this feed first drops onto a broadly conical, upraised central portion 28' of the feed-dispensing pan, which is in vertical alignment with the opening 36 in the auger tube. The feed then slides down the inclined surfaces of this conical portion and into the annular, dished part of the dispensing pan 28 and, when this dished part becomes filled, the downwardly dropping feed steadily accumulates within the drop member 30, rising upwardly therein.

As the feed falls downwardly through opening 36, it is channeled and guided between a pair of spaced, generally parallel baffle means, including a first flat, vertical baffle 38 and a second similar such baffle 40 which extends downwardly a lesser distance than baffle 38. Near the bottom extremity of the shorter baffle 40 is located a movable paddlelike baffle element 42. The baffles 38 and 40 are fixed to the inside of the feed-drop member 30, and disposed immediately adjacent and in contact with the sides of the auger tube 22, preferably being mounted by angularly offset end portions 39 and 41, respectively, which are riveted or otherwise secured to oppositely disposed portions of the conical walls of the feed-drop member.

As stated, the lower baffle element 42 is movably mounted, preferably upon a rod 44 which passes through offset flanges 46 at each end extremity of this baffle. This rod is journaled in the conical walls of member 30, such that the baffle 42 is swingably suspended therefrom by rod 44, with the major portion of this baffle extending downwardly from the bottom edge of the fixed baffle 40. Movable baffle 42 has an outwardly projecting flange 48 at its bottom extremity, by which a linkage 50 connects thereto. This linkage extends upwardly to a downwardly depending flange portion 52 of a plate 53, which is attached to the bottom of the aforementioned switch housing 32 located at the top of drop member 30.

Switch housing 32 is secured by the aforementioned plate 53 to the top of a pivotable support rod 54, which extends through and is journaled in oppositely disposed apertures in the upper walls of the drop member 30, immediately above the auger housing 22 (FIGS. 2 and 4). In this manner, the feed which drops downwardly into the drop member 30 from the tubular auger housing 22 will, when the rising level of feed within the latter has built up to the level at which the bottom of the movable paddle or baffle 42 is positioned, push this baffle sideways (counterclockwise as seen in FIG. 4) about its mounting rod 44. This moves linkage 50 upwardly, thereby pivoting the switch housing 32 about its mounting rod 54. Switch housing 32 contains a position-sensitive switch element such as a mercury switch 56. This switch is connected into the excitation circuitry for the auger drive motor 18 (FIG. 1), such that when the switch housing is tipped or tilted in the manner just noted, the switch opens this circuitry to deenergize the drive motor and interrupt the operation of the auger conveyor, thereby stopping the flow of feed downwardly into the feeder pan.

In this manner, the movable baffle element 42 acts as a paddlelike feeler arm or switch arm, the relative position of which controls the operation of the auger conveyor. In this operation, the sensitivity and overall reliability of the feed-sensing means, centering about the operation of the paddlelike feeler arm 42, is greatly enhanced by the aforementioned arrangement of baffles directly flanking the auger tube and the opening in the bottom thereof through which feed drops. These baffles, of which the feeler arm or blade 42 in essence comprises a part, channel the downwardly falling feed and form it into a reasonably well defined stream, such that when the feed-dispensing pan 28 becomes filled and the feed begins to build up within the conical drop member 30, the incoming feed is guided directly against the inner surface of the feeler arm 42, and the latter is immediately moved whenever the level of the feed reaches the bottom of this baffle. This produces a more positive and more certain controlling operation of the supply auger at the desired maximum feed level within the drop member.

It will be noted that the feed-dispensing pan 28 is suspended from the drop member 30 by links 58 and S-shaped hook members 60, which pass through and hook into any selected one of a series of apertures 62 (FIG. 2) formed in the walls of the drop member. Thus, by placing the hook members 60 in different selected individual apertures, the height of the pan 28 with respect to the drop member 30 may be varied and adjusted, thereby simultaneously varying the total volume of feed which will be present within the feeder pan when the feed-sensing means shuts the auger conveyor off.

As seen in FIG. 2, the auger tube 22 terminates a brief distance downstream of the control feeder pan 26. Mounted in the downstream end of the auger tube is a bearing means 64, which comprises a cylindrically stepped housing 66 having a portion of reduced diameter which fits inside the auger tube and a portion of larger diameter which abuts the end of the tube. The housing 66 encloses a conventional bearing (not specifically shown) which rotatably mounts an arbor shaft 68 that extends inwardly of the end of the auger tube, to a position wherein the inner end of the shaft extends across most of the opening 36 in the bottom of the auger tube.

Attached to the arbor shaft 68 at a position immediately adjacent the downstream edge of the opening 36 in the auger tube is a pluglike member 70 of circular cross section (FIGS. 2 and 3) which provides an anchor for the downstream end of the auger member, designated 72. More specifically, the anchor member 70 is a cylindrical metal member which fits closely within the tubular auger housing and which is fixedly mounted on the arbor shaft 68. The anchor 70 has a helically shaped slotlike opening 74 (FIG. 3) extending along one side, provided for the purpose of receiving one end of the helical auger member 72. This end of the auger is secured in position within the aforementioned slot 74, as by a set screw 76 located within a threaded passage in the anchor 70 oriented perpendicular to slot 74 (FIG. 3). In this manner, the downstream end of the auger is securely anchored to the arbor shaft 68, which in turn is firmly anchored within the auger housing by the bearing means 64.

Between the anchor member 70 and the bearing means 64 located at the outer end of the arbor shaft 68 is a circular, disclike element 78 (FIGS. 2 and 3). Preferably, this element is comprised of an annular metal ring 80 welded or otherwise secured onto the arbor shaft, together with a ringlike member 82 positioned immediately adjacent the metal ring 80 and secured thereto by screws 84 or the like. The ring member 82 is made of a lubricous plastic material such as that known and sold commercially under the trademark "Nylon," and the outer diameter thereof is larger than that of the metal ring 80 to which it is attached, such that the plastic ring 82 provides a sliding engagement against the inner circumference of the tubular auger housing 22. In this manner, the disclike assembly or element 78 functions as a bearing which centers and axially supports the arbor shaft 68 in place within the auger tube.

Because the diameter of the pluglike anchor member 70 approaches the inner diameter of the auger tube 22, the anchor acts as a barrier to feed moved along the auger tube by the auger member 72 located therewithin, to obstruct the passing of such feed beyond the location of the opening 36 in the bottom of the auger tube and, in effect, to force all of the feed which is moved by the auger as far as the opening 36 downwardly through such opening. Furthermore, because there is a sliding contact between the outer periphery of the disclike assembly 78 and the inside of the auger tube, this element also acts as a barrier which, due to the absence of any appreciable clearance between it and the inside of the auger tube, will positively block the passage of any feed which does happen to work its way or to be forced beyond the position of the pluglike anchor member 70.

Consequently, all such feed is prevented from working its way or being forced further along the arbor shaft 68 and into the bearing means 64, where such feed would surely foul the bearing and in time cause it to malfunction. As will be recognized, this is an important feature, since it is known that at least small amounts of feed can and sometimes do move across the feed-drop opening 36 and, if not otherwise prevented from doing so, this feed will surely find its way into the bearings for the arbor shaft, or any other similar bearing serving to rotatably mount the downstream end extremity of the auger. Additionally, in the event that the feed-level sensing means within the control feeder pan somehow does not operate as soon as it should, as for example if a mechanical bind or jamming develops, the downwardly falling feed within the feed-drop member 30 can rapidly build up into a loosely packed pile which in effect encloses the bottom of the auger tube, whereupon additional feed moved along by the auger very strongly tends to move onward down the auger tube.

The dual barrier means provided by members 70 and 78, in combination with the internal baffle structures and the feed-sensing arm 42 described previously, cooperate together to very effectively overcome this previous source of difficulty. That is, the feed-sensing feeler arm is, in accordance with the present invention, more sensitive and much more reliable in and of itself, together with the positive blockage of feed from further travel along the auger tube and the effective forcing of such feed down through the auger tube opening, the end result in a substantial elimination of the difficulties attending previous control feeder pan devices of a somewhat generally similar nature.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. The combination of a feeder pan means for poultry, livestock and the like and an auger-type feed conveyor which comprises: a vertically disposed laterally enclosed feed-drop member; feed-dispenser means in feed flow communication with the bottom extremity of said drop member; an open-center helical-type auger conveyor means having a tubular housing extending diametrically across said drop member above said dispenser means; said tubular housing having an opening therein located in vertical alignment with the interior of said feed-drop member, such that feed moved along said tubular housing by the auger therewithin will fall downward through said opening and into said drop member; and feed-blocking barrier means located within said tubular housing in proximity with the said opening therein, for obstructing the passage of feed along said housing to points beyond the barrier means, said barrier means including a pluglike member of generally circular cross section having means defining an opening spaced radially from the center thereof for removably receiving portions of said helical auger.

2. The combination recited in claim 1, including means for releasably attaching said pluglike member to said auger, such that said member is rotated within said housing by rotary movement of said auger.

3. The combination recited in claim 2, wherein said conveyor means further includes an arbor shaft located within said auger housing and a bearing means journaling said shaft within such housing, said pluglike member being mounted upon said shaft.

4. The combination recited in claim 3, wherein said auger ends at said pluglike member and such member is secured to said shaft to form an anchor for said auger.

5. The combination recited in claim 3, wherein said barrier means further includes at least one circular disclike element mounted on said shaft and fitting within said housing, said element having a diameter closely approaching the inside diameter of said housing and acting both as a bearing for said shaft and as a barrier to prevent the passage of feed therebeyond.

6. The combination recited in claim 5, wherein said disclike element is secured onto said shaft for rotation within said housing.

7. The combination recited in claim 6, wherein said element has peripheral portions of lubricous material for smooth sliding rotational contact with the interior of said housing.

8. The combination recited in claim 1, wherein said conveyor means further includes an arbor shaft located within said auger housing and a bearing means journaling said shaft within such housing, wherein said barrier means includes at least one circular disclike element mounted on said shaft and fitting within said housing, said element having a diameter closely approaching the inside diameter of said housing and acting both as a bearing for said shaft and as a barrier to prevent the passage of feed therebeyond, and said element having peripheral portions of lubricous material for smooth sliding rotational contact with the interior of said housing.

9. The combination of a feeder pan means for poultry, livestock and the like and an auger-type feed conveyor which comprises: a vertically disposed laterally enclosed feed-drop member; feed-dispenser means in feed flow communication with the bottom extremity of said drop member; an auger-type conveyor means having a tubular housing extending diametrically across said drop member above said dispenser means; said tubular housing having an opening therein located in vertical alignment with the interior of said feed-drop member, such that feed moved along said tubular housing by the auger therewithin will fall downward through said opening and into said drop member; feed blocking barrier means located within said tubular housing in proximity with the said opening therein, for obstructing the passage of feed along said housing to points beyond the barrier means; said conveyor means including an electric drive motor for said auger and said feed-drop member incorporating sensor means for deenergizing such motor when a predetermined amount of feed is present within said drop member; said sensor means including a paddlelike feeler arm means mounted for movement in response to rising levels of feed within said drop member and switching means actuable upon a predetermined extent of movement of said arm means; and said feed-drop member including internal baffle means extending downwardly of said auger housing opening to at least partially confine feed dropping downwardly through such opening into a stream, said feeler arm means being positioned along a side of such stream.

10. The combination recited in claim 9, wherein said baffle means includes a flat baffle member positioned in a plane located at one side of said auger housing opening.

11. The combination recited in claim 10, wherein said feeler arm means is positioned generally parallel to said flat baffle member and is spaced laterally therefrom, said stream passing between said baffle and said feeler arm means.

12. The combination recited in claim 9, wherein said barrier means includes a pluglike member of generally circular cross section, said member being attached to said auger and rotated within said housing by rotary movement of said auger.

13. The combination recited in claim 12, wherein said conveyor means further includes an arbor shaft located within said auger housing and a bearing means journaling said shaft within such housing, said pluglike member being mounted upon said shaft.

14. The combination recited in claim 13, wherein said barrier means includes at least one circular disclike element mounted on said shaft and fitting within said housing, said element having a diameter closely approaching the inside diameter of said housing and acting both as a bearing for said shaft and as a barrier to prevent the passage of feed therebeyond.

15. The combination recited in claim 14, wherein said disclike element is secured onto said shaft for rotation within said housing, and wherein said element has peripheral portions of lubricous material for smooth sliding rotational contact with the interior of said housing.

Big D P-409
721,720

PO-1050
(5/69)

UNITED STATES PATENT OFFICE
CERTIFICATE OF CORRECTION

Patent No. 3,566,843      Dated March 2, 1971

Inventor(s) Robert L. Van Huis, Dee Dexter Allen

It is certified that error appears in the above-identified patent and that said Letters Patent are hereby corrected as shown below:

Column 1, Line 65;
After "disclike" insert --- bearing along its lengt together with a plug-like ---

Signed and sealed this 13th day of July 1971.

(SEAL)
Attest:

EDWARD M.FLETCHER,JR.
Attesting Officer

WILLIAM E. SCHUYLER, J
Commissioner of Patent